E. F. W. ALEXANDERSON.
PHASE BALANCER.
APPLICATION FILED JUNE 20, 1912.
1,093,594.
Patented Apr. 21, 1914.
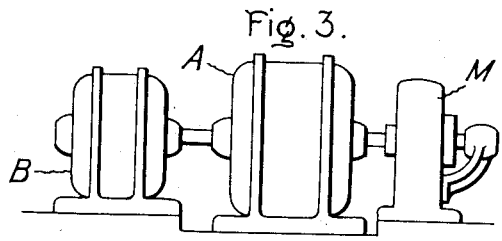
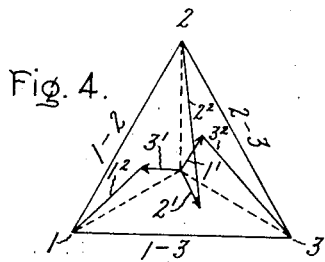
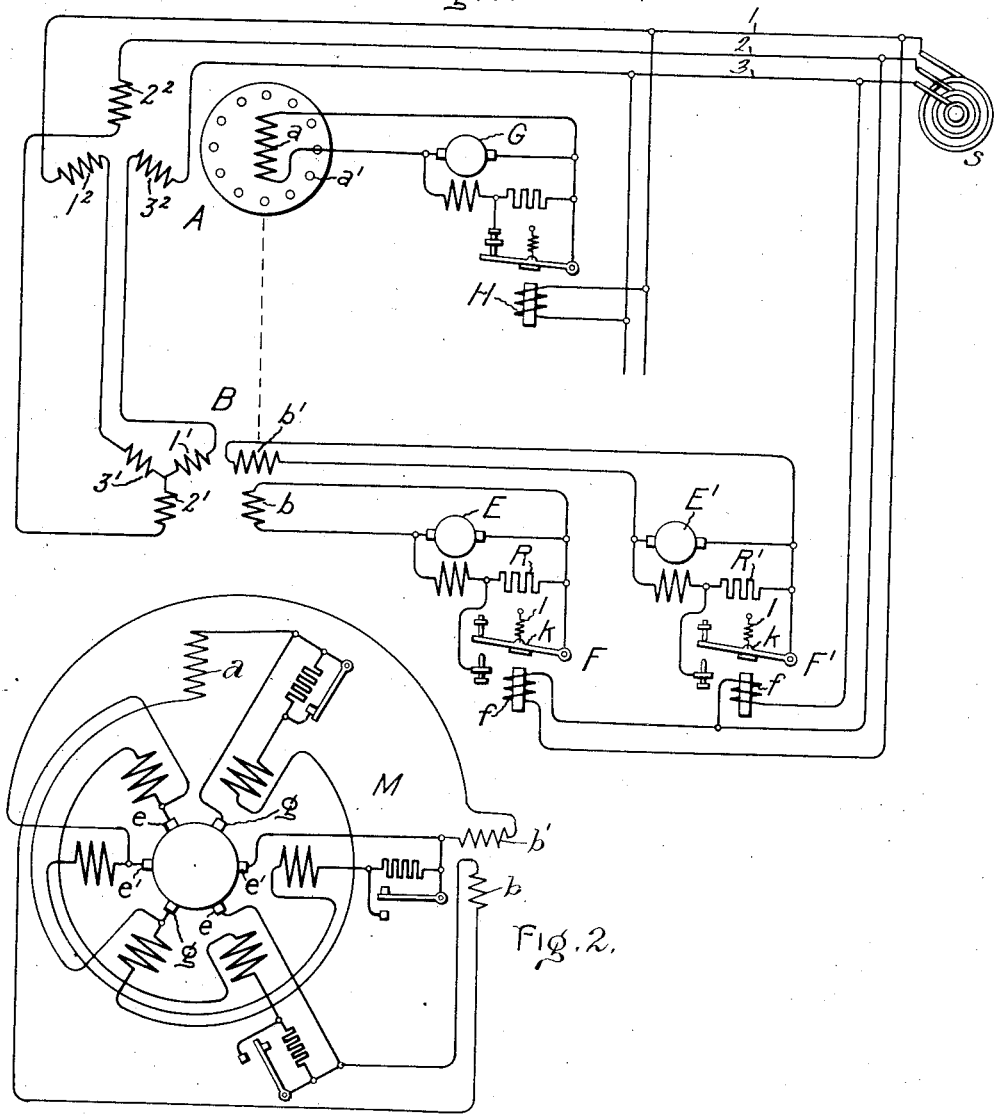
WITNESSES:
J. Earl Ryan
J. Ellis Glen
INVENTOR:
ERNST F. W. ALEXANDERSON,
BY Albert G. Davis
HIS ATTORNEY.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

PHASE-BALANCER.

1,093,594.  Specification of Letters Patent.  Patented Apr. 21, 1914.

Application filed June 20, 1912.  Serial No. 704,706.  REISSUED

*To all whom it may concern:*

Be it known that I, ERNST F. W. ALEXANDERSON, a citizen of the United States, residing at Schenectady, county of Schenectady, State of New York, have invented certain new and useful Improvements in Phase-Balancers, of which the following is a specification.

My invention relates to a phase balancer for polyphase transmission systems.

The voltage and current of polyphase transmission systems is often unbalanced because a single phase load or lighting circuits are connected thereto, or because unbalanced polyphase apparatus is operated from the systems. Such unbalancing limits the usefulness of the transmission system and causes the apparatus connected to the system to be special and expensive. In cases of emergency it is often desirable to interchange power between systems, but it is objectionable to do this when one of the systems is balanced and the other unbalanced, because the balanced system will become thereby unbalanced.

My invention has for its object to balance such a polyphase transmission system in a simple and efficient manner by employing a phase balancer comprising a synchronous dynamo-electric machine and an auxiliary dynamo-electric machine connected therewith, the phase rotation of said machines preferably being opposite.

Other features of novelty which characterize my invention are pointed out with particularity in the claims annexed to and forming a part of this specification.

For a better understanding of my invention, reference may be had to the following description taken in connection with the accompanying drawing in which—

Figure 1 shows diagrammatically a system arranged in accordance with my invention; Fig. 2 shows diagrammatically a modification of a portion of the system of Fig. 1; Fig. 3 is an outline of the apparatus used in carrying out the modified system, and Fig. 4 is a voltage diagram.

Referring to the drawing, S is a source of alternating current power connected to polyphase mains 1, 2, 3, of a transmission system. An unbalanced load may be connected to this system, for example, by connecting single phase translating devices to the single phase mains connected to the two outside mains 1 and 3. This unbalanced load will tend to cause a component of energy, as for example the voltage between mains 1 and 3 to be less than the voltage between mains 1 and 2, and mains 2 and 3. In order to correct this unbalancing of the voltage between the mains, I provide a phase-balancer which comprises a synchronous dynamo-electric machine A and an auxiliary dynamo-electric machine B connected in series across the mains, the phase rotation of the machine A and the auxiliary machine B preferably being opposite. Preferably also the phase relation of their voltages is adapted to be relatively shifted. I prefer to shift the phase of the voltage of the auxiliary machine relatively to that of the synchronous machine. The synchronous machine A and the auxiliary machine B are preferably mechanically connected together. In order to shift the phase of the voltage of the auxiliary machine relatively to that of the synchronous machine, I provide the auxiliary machine with a field winding comprising a plurality of portions having different magnetic axes and relatively vary their excitation. I have shown the auxiliary machine field winding as composed of two portions $b$ and $b'$ having their magnetic axes arranged at substantially 90 electrical degrees, each portion having a source of excitation which may be varied, such as direct current exciters $E$ and $E'$. The armature of the auxiliary machine B may be connected between the synchronous machine and the mains or it may be connected as hereinafter described. If it is connected between the synchronous machine and the mains, it will be necessary to insulate it for the potential of the mains. I have shown a three-phase system in the drawing, in which the armature of the three-phase auxiliary machine B is connected in series with the armature of the three-phase synchronous machine A so as to form the Y-point for the machine. By thus connecting the auxiliary machine B, its windings are connected between the neutral point and the windings of machine A and consequently need only be insulated for the voltage, which it is designed to generate. Regulators F, dependent upon the voltage of the mains 1, 2 and 3, may be provided for relatively changing the phase relation of the voltages of the machines A and B.

The armature of auxiliary machine B has three phases $1'$, $2'$ and $3'$, which are connected in Y. The armature of the synchronous machine A has three phases $1^2$, $2^2$ and $3^2$, each of which is connected at one end to the corresponding main. The other ends of the phases of the armature of the machine A are connected to the ends of the phases of the armature of auxiliary machine B, phase $2^2$ of machine A being connected to phase $2'$ of auxiliary machine B but in such a manner that the voltage of this phase of the auxiliary machine opposes that of phase $2^2$ of the synchronous machine, phase $1^2$ and phase $3^2$ of machine A being connected to phase $3'$ and phase $1'$ of machine B, respectively. With this connection of the phases of the machines A and B, their phase rotation is opposite. The synchronous machine A has a field winding $a$ excited from a suitable source, such as an exciter G. I have also shown the field of machine A provided with an amortisseur winding $a'$ to increase its synchronizing power and to dampen out pulsations due to single phase armature reactions, which occur because part of the armature windings act as motor windings and the other parts of the armature windings act as generator windings. The field excitation of the machine A may be regulated by means of a regulator H, which depends on the unbalanced load across the mains 1 and 3. I have shown the regulator H diagrammatically as a voltage regulator of the Tirrill type, the operation of which is well understood.

Consider the mains 1, 2, 3 supplying among other loads, an unbalanced load across mains 1 and 3, this will tend to reduce the voltage between these mains while the voltage between mains 1 and 2, and mains 2 and 3 will tend to rise. By the use of my phase balancer described above, the voltage between the mains 1 and 3 is increased while the voltage between the mains 1 and 2, and 2 and 3 is reduced. This is due to the fact that two of the phases of the phase balancer act as generators, while the third phase acts as a motor. The motor phase is phase 2, and it takes power from main 2 and returns power to mains 1 and 3.

In order to explain the theory of operation of my phase balancer, the winding on synchronous machine A will be considered as arranged along two axes which are substantially at right angles, phase $2^2$ being arranged along one axis and phases $1^2$, $3^2$ being arranged along the other axis. The winding on auxiliary machine B will be considered as similarly arranged, phase $2'$ being arranged along one axis and phases $3'$ and $1'$ being arranged along the other axis. Since as explained above, phase 2 of the phase balancer is a motor phase, the current flowing in phase $2^2$ of the synchronous machine A, considered as arranged along one axis, is reversed with respect to the voltage generated therein, but since phases 1 and 3 of the phase balancer, are generator phases, the current flowing in phases $1^2$ and $3^2$ of synchronous machine A, considered as arranged along an axis at right angles to that of phase $2^2$, is in the same direction as the voltage generated therein. From this it will be seen that the phase rotation of the current in machine A is opposite to the phase rotation of the voltage therein. In order to make current flow from phase $2^2$ into phases $1^2$ and $3^2$ of the synchronous machine, it is necessary to supply electromotive force to pump this current. This source of electromotive force is the auxiliary machine B. The flow of current in the auxiliary machine B is in the same direction as in synchronous machine A, because the current flowing out of phase $2^2$ of synchronous machine A flows into phase $2'$ of auxiliary machine B, and the current flowing out of phases $3'$ and $1'$ of auxiliary machine B flows into phases $1^2$ and $3^2$ of synchronous machine A. It will therefore be seen that the phase rotation of the current in synchronous machine A and auxiliary machine B is the same, but all the phases of auxiliary machine B, act as generator phases, that is, the voltage generated in these windings is in the same direction as the current flowing therein, and consequently the phase rotation of the voltage of auxiliary machine B is opposite to the phase rotation of the voltage of synchronous machine A.

In order to balance the voltages between the mains, the phase relation of the voltages of machine A and auxiliary machine B is shifted, as explained above, until the voltages between the mains are equal. The resultant field of auxiliary machine B may be shifted through 360° by suitably varying and reversing the excitation of the portions $b$ and $b'$ of the auxiliary machine field winding.

Referring to the voltage diagram of Fig. 4, the various voltage vectors are lettered to correspond to the mains and the portions of the various machines in which the voltage is produced or on which the voltage is impressed, thus the vector lettered 1—2 corresponds to the voltage between mains 1—2, the vector $1^2$ corresponds to the terminal voltage of phase $1^2$ of machine A, the vector $3'$ corresponds to the voltage of phase $3'$ of auxiliary machine B, etc.

Each of the regulators F and F' comprises a magnet $f$ connected to two of the polyphase mains. Each magnet controls a vibratory contact $k$ working against a spring $l$ in a manner which is well understood in connection with the operation of a Tirrill regulator, which I have shown diagrammatically. The vibratory contacts $k$ cut in and out resistances R and R' in the field circuits of the exciters E and E'. The contacts are arranged, however, so that when the voltage between two of the mains is high, one of the resistances R or R' is shortcircuited and the field of the corresponding exciter increased thus increasing the voltage of the exciter and the part of the field of the auxiliary machine B supplied thereby. Consider the case in which the voltage between mains 1 and 2 is high, then the corresponding regulator operates to increase the voltage of exciter E and the excitation of the portion $b$ of the field winding of the auxiliary machine. This will shift the resultant field of the auxiliary machine and change the phase relation of its voltage with respect to that of the synchronous machine A, until the resultant voltage of the phase balancer will lower the voltage between mains 1 and 2.

The exciters E, E' and G may be combined in one machine as shown in Figs. 2 and 3, in which case my phase balancer will then comprise only three machines, a synchronous machine A, an auxiliary machine B and an exciter M. The exciter M may be an ordinary direct current generator, in which case variable resistances would be placed in series with the field winding $a$ and the portions $b$ and $b'$ of the field winding of the auxiliary machine. In the arrangement shown in Fig. 2, sets of brushes $g$, $g$ diametrically opposite each other are connected to the field winding $a$, sets of brushes $e$, $e$ are connected to the portion $b$ of the field winding of auxiliary machine B, and sets of brushes $e'$, $e'$ are connected to the portion $b'$ of the field winding of the auxiliary machine. Diametrically opposite field poles on the exciter M are connected in shunt to the corresponding sets of brushes, and the field excitation of each pair of poles may be regulated and consequently the voltage generated between the sets of brushes $g$, $g$, $e$, $e$, and $e'$, $e'$, in the same way as the fields of exciters E, E' and G are regulated by regulators F, F' and H.

A phase balancer in accordance with my invention may be installed in a power station which furnishes unbalanced polyphase current due to, say a single phase load. It would be used in this case to maintain the voltage balanced and to increase the output of the generators in the station by allowing them to generate balanced polyphase current. My phase balancer may also be used on the distributing end of a transmission system to correct any unbalancing of the voltage of the system, and also, if provided with a suitable regulator dependent on the unbalanced load, to act as a synchronous condenser and maintain the voltage and power factor of the system.

I desire it to be understood that my invention is not limited to the particular arrangements described, and I aim in the appended claims to cover all modifications which do not depart from the spirit and scope of my invention.

What I claim as new and desire to secure by Letters Patent of the United States, is:—

1. A phase balancer comprising a synchronous dynamo-electric machine and an auxiliary dynamo-electric machine connected therewith, the phase rotation of said machines being opposite.

2. A phase balancer comprising a polyphase synchronous dynamo-electric machine and a polyphase auxiliary dynamo-electric machine connected in series therewith, the phase rotation of said machines being opposite.

3. A phase balancer comprising a synchronous dynamo-electric machine and an auxiliary dynamo-electric machine connected therewith, the phase rotation of said synchronous machine and said auxiliary machine being opposite, and means for relatively changing the phase relation of the voltages of said synchronous machine and said auxiliary machine.

4. In a system of transmission, polyphase mains, and means for balancing a component of the energy on said mains comprising a synchronous dynamo-electric machine and an auxiliary dynamo-electric machine connected in series across the mains, the phase rotation of said synchronous machine and said auxiliary machine being opposite, and means for shifting the phase of the voltage of said auxiliary machine relatively to that of said synchronous machine.

5. In a system of transmission, polyphase mains, and means for balancing a component of the energy on said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, and means for relatively changing the phase relation of the voltages of said synchronous machine and said auxiliary machine.

6. In a system of transmission, polyphase mains, and means for balancing a component of the energy on said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, and means for shifting the phase of the voltage of said auxiliary machine relatively to that of said synchronous machine.

7. In a system of transmission, polyphase mains, and means for balancing a component of the energy on said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, and means for relatively changing the phase relation of the voltages of said synchronous machine and said auxiliary machine.

8. In a system of transmission, polyphase mains, and means for balancing a component of the energy on said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, and means for shifting the phase of the voltage of said auxiliary machine relatively to that of said synchronous machine.

9. In a system of transmission, polyphase mains, and means for balancing a component of the energy on said mains comprising a synchronous dynamo-electric machine and an auxiliary dynamo-electric machine connected in series across the mains, the phase rotation of said synchronous machine and said auxiliary machine being opposite, a field winding for said auxiliary machine comprising a plurality of portions, and means for relatively varying the excitation of said portions so as to shift the phase of the voltage of said auxiliary machine relatively to that of said synchronous machine.

10. In a system of transmission, polyphase mains, and means for balancing a component of the energy on said mains comprising a synchronous dynamo-electric machine and an auxiliary dynamo-electric machine connected in series across the mains, the phase rotation of said synchronous machine and said auxiliary machine being opposite, a field winding for said auxiliary machine comprising a plurality of portions, a source of excitation for each of said portions, and means for varying the excitation of said portions so as to shift the phase of the voltage of said auxiliary machine relatively to that of said synchronous machine.

11. In a system of transmission, polyphase mains, and means for balancing a component of the energy on said mains comprising a synchronous dynamo-electric machine and an auxiliary dynamo-electric machine connected in series across the mains, the phase rotation of said synchronous machine and said auxiliary machine being opposite, a field winding for said auxiliary machine comprising two portions arranged at substantially 90 electrical degrees, and means for relatively varying the excitation of said portions so as to shift the phase of the voltage of said auxiliary machine relatively to that of said synchronous machine.

12. In a system of transmission, polyphase mains, and means for balancing a component of the energy on said mains comprising a synchronous dynamo-electric machine and an auxiliary dynamo-electric machine connected in series across the mains, the phase rotation of said synchronous machine and said auxiliary machine being opposite, a field winding for said auxiliary machine comprising two portions arranged at substantially 90 electrical degrees, a source of excitation for each of said portions, and means for varying the excitation of said portions so as to shift the phase of the voltage of said auxiliary dynamo-electric machine relatively to that of said synchronous machine.

13. In a system of transmission, polyphase mains, and means for balancing the voltage of said mains comprising a synchronous dynamo-electric machine and an auxiliary dynamo-electric machine connected in series across the mains, the phase rotation of said synchronous machine and said auxiliary machine being opposite, and means dependent upon the voltage of said mains for relatively changing the phase relation of the voltages of said synchronous machine and said auxiliary machine.

14. In a system of transmission, polyphase mains, and means for balancing the voltage of said mains comprising a synchronous dynamo-electric machine and an auxiliary dynamo-electric machine connected in series across the mains, the phase rotation of said synchronous machine and said auxiliary machine being opposite, and means dependent upon the voltage of said mains for shifting the phase of the voltage of said auxiliary machine relatively to that of said synchronous machine.

15. In a system of transmission, polyphase mains, and means for balancing the voltage of said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, and means dependent upon the voltage of said mains for relatively changing the phase relation of the voltages of said synchronous machine and said auxiliary machine.

16. In a system of transmission, polyphase mains, and means for balancing the voltage of said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, and means dependent upon the voltage of said mains for shifting the phase of the voltage of said auxiliary machine relatively to that of said synchronous machine.

17. In a system of transmission, polyphase mains, and means for balancing the voltage of said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, and means dependent upon the voltage of said mains for shifting the phase of the voltage of said auxiliary machine relatively to that of said synchronous machine.

18. In a system of transmission, polyphase mains, and means for balancing the voltage of said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, a field winding for said auxiliary machine comprising a plurality of portions, and means for relatively varying the excitation of said portions so as to shift the phase of the voltage of said auxiliary machine relatively to that of said synchronous machine.

19. In a system of transmission, polyphase mains, and means for balancing the voltage of said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, a field winding for said auxiliary machine comprising a plurality of portions, a source of excitation for each of said portions, and means for varying the excitation of said portions so as to shift the phase of the voltage of said auxiliary machine relatively to that of said synchronous machine.

20. In a system of transmission, polyphase mains, and means for balancing the voltage of said mains comprising a polyphase synchronous dynamo electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, a field winding for said auxiliary machine comprising two portions arranged at substantially 90 electrical degrees, and means for relatively varying the excitation of said portions so as to shift the phase of the voltage of said auxiliary machine relatively to that of said synchronous machine.

21. In a system of transmission, polyphase mains, and means for balancing the voltage of said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, a field winding for said auxiliary machine comprising two portions arranged at substantially 90 electrical degrees, a source of excitation for each of said portions, and means for varying the excitation of said portions so as to shift the phase of the voltage of said auxiliary machine relatively to that of said synchronous machine.

22. In a system of transmission, polyphase mains, and means for balancing the voltage of said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, a field winding for said auxiliary machine comprising a plurality of portions, and means for relatively varying the excitation of said portions so as to shift the phase of the voltage of said auxiliary machine relatively to that of said synchronous machine.

23. In a system of transmission, polyphase mains, and means for balancing the voltage of said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, a field winding for said auxiliary machine comprising a plurality of portions, a source of excitation for each of said portions, and means for varying the excitation of said portions so as to shift the phase of the voltage of said auxiliary machine relatively to that of said synchronous machine.

24. In a system of transmission, polyphase mains, and means for balancing the voltage of said means comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, a field winding for said auxiliary machine comprising two portions arranged at substantially 90 electrical degrees, and means for relatively varying the excitation of said portions so as to shift the phase of the voltage of said auxiliary machine relatively to that of said synchronous machine.

25. In a system of transmission, polyphase mains, and means for balancing the voltage of said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, a field winding for said auxiliary machine comprising two portions arranged at substantially 90 electrical degrees, a source of excitation for each of said portions, and means for varying the excitation of said portions so as to shift the phase of the voltage of said auxiliary machine relatively to that of said synchronous machine.

26. In a system of transmission, polyphase mains having an unbalanced load thereon, means for balancing the voltage of said mains comprising a synchronous dynamo-electric machine and an auxiliary dynamo-electric machine connected in series across the mains, the phase rotation of said synchronous machine and said auxiliary machine being opposite, and means dependent on the unbalanced load for changing the excitation of said synchronous machine.

27. In a system of transmission, polyphase mains having an unbalanced load thereon, means for balancing the voltage of said mains comprising a synchronous dynamo-electric machine and an auxiliary dynamo-electric machine connected in series across the mains, the phase rotation of said synchronous machine and said auxiliary machine being opposite, means for relatively changing the phase relation of the voltages of said synchronous machine and said auxiliary machine, and means dependent on the unbalanced load for changing the excitation of said synchronous machine.

28. In a system of transmission, polyphase mains having an unbalanced load thereon means for balancing the voltage of said polyphase mains comprising a synchronous dynamo-electric machine and an auxiliary dynamo-electric machine connected in series across the polyphase mains, the phase rotation of said synchronous machine and said auxiliary machine being opposite, means for shifting the phase of the voltage of said auxiliary machine relatively to that of said synchronous machine, and means dependent on the unbalanced load for changing the excitation of said synchronous machine.

29. In a system of transmission, a source of alternating current power, polyphase mains connected thereto, and means for balancing a component of the energy on said mains comprising a synchronous dynamo electric machine and an auxiliary dynamo electric machine connected in series across the mains, and means for shifting the phase of the voltage of said auxiliary machine relatively to that of said synchronous machine.

30. In a system of transmission, a source of alternating current power, polyphase mains connected thereto, and means for balancing a component of the energy on said mains comprising a polyphase synchronous dynamo electric machine, a polyphase auxiliary dynamo electric machine mechanically connected to said synchronous machine, the armature of said auxiliary machine being connected in series with the armature of said synchronous machine across the mains, and means for relatively changing the phase relation of the voltages of said synchronous machine and said auxiliary machine.

31. In a system of transmission, a source of alternating current power, polyphase mains connected thereto, and means for balancing a component of the energy on said mains comprising a polyphase synchronous dynamo electric machine, a polyphase auxiliary dynamo electric machine mechanically connected to said synchronous machine, the armature of said auxiliary machine being connected in series with the armature of said synchronous machine across the mains, and means for shifting the phase of the voltage of said auxiliary machine relatively to that of said synchronous machine.

32. In a system of transmission, a source of alternating current power, polyphase mains connected thereto, and means for balancing a component of the energy on said mains comprising a polyphase synchronous machine, the armature thereof being connected to said mains, a polyphase auxiliary machine mechanically connected to said synchronous machine, the armature of said auxiliary machine being connected in series with the armature of said synchronous machine and forming a Y-point for said synchronous machine, and means for relatively changing the phase relation of the voltages of said synchronous machine and said auxiliary machine.

33. In a system of transmission, a source of alternating current power, polyphase mains connected thereto, and means for balancing a component of the energy on said mains comprising a polyphase synchronous machine, the armature thereof being connected to said mains, a polyphase auxiliary machine mechanically connected to said synchronous machine, the armature of said auxiliary machine being connected in series with the armature of said synchronous machine and forming a Y-point for said synchronous machine, and means for shifting the phase of the voltage of said auxiliary machine relatively to that of said synchronous machine.

In witness whereof, I have hereunto set my hand this 18th day of June, 1912.

ERNST F. W. ALEXANDERSON.

Witnesses:
 MARGARET E. WOOLLEY,
 HELEN ORFORD.

---

Corrections in Letters Patent No. 1,093,594.

It is hereby certified that in Letters Patent No. 1,093,594, granted April 21, 1914, upon the application of Ernst F. W. Alexanderson, of Schenectady, New York, for an improvement in "Phase-Balancers," errors appear in the printed specification requiring correction as follows: Page 1, line 101, after the word "machine" insert the reference-letter *A;* page 6, line 37, for the word "svnchronous" read *synchronous;* and that the said Letters Patent should be read with these corrections therein that the same may conform to the record of the case in the Patent Office.

Signed and sealed this 12th day of May, A. D., 1914.

[SEAL.]

J. T. NEWTON,
*Acting Commissioner of Patents.*